Sept. 3, 1963   J. P. SHURCLIFF   3,102,742
SELECTIVE FRICTION TELESCOPIC CONNECTORS
Filed July 12, 1961   2 Sheets-Sheet 1
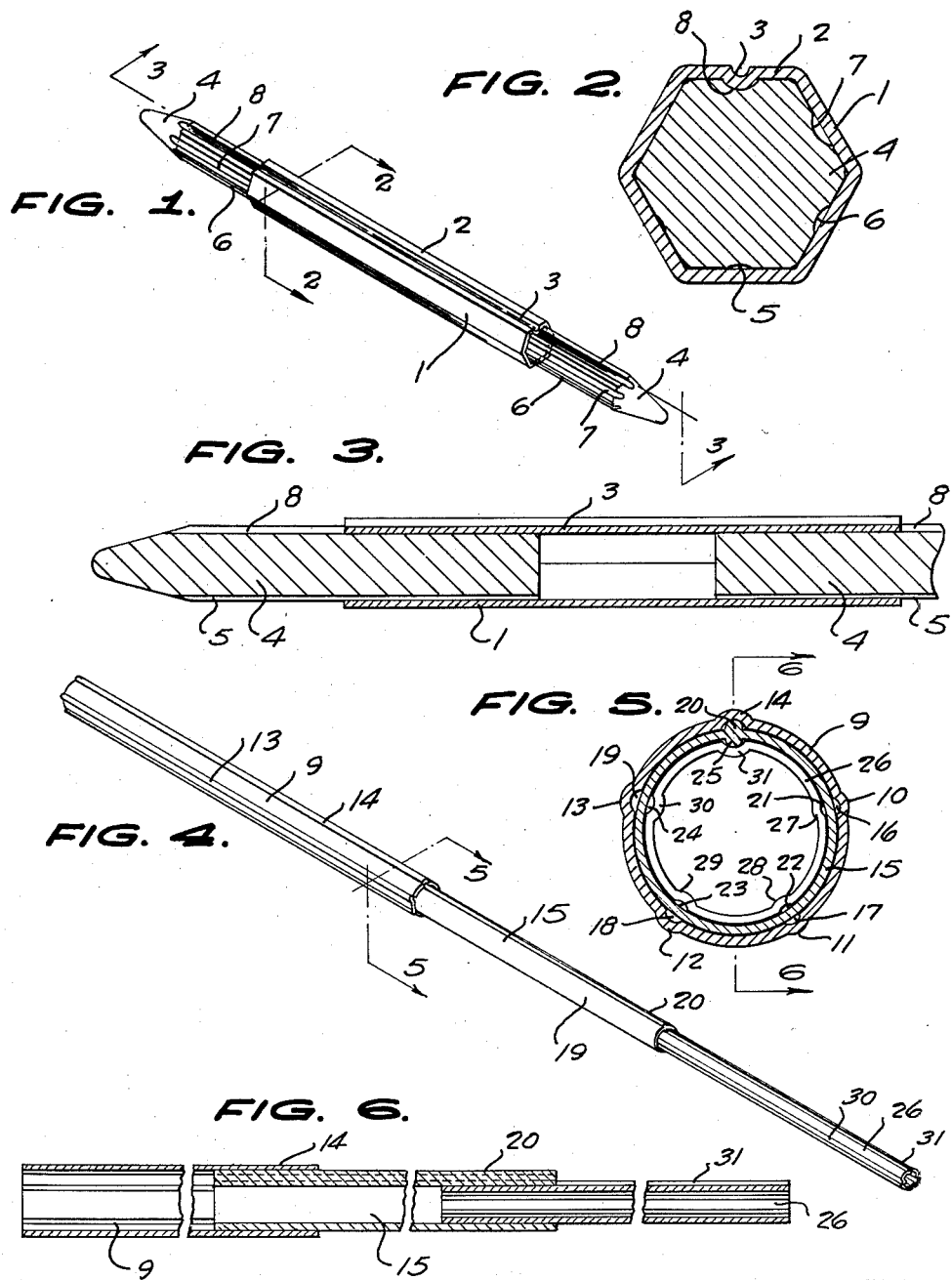
INVENTOR.
JOHN P. SHURCLIFF,
BY
*Linton + Linton*
ATTORNEYS.

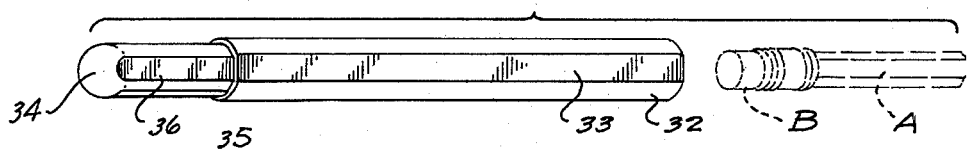
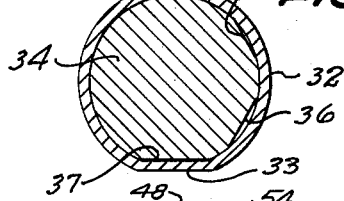
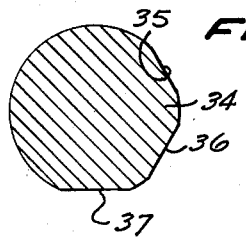
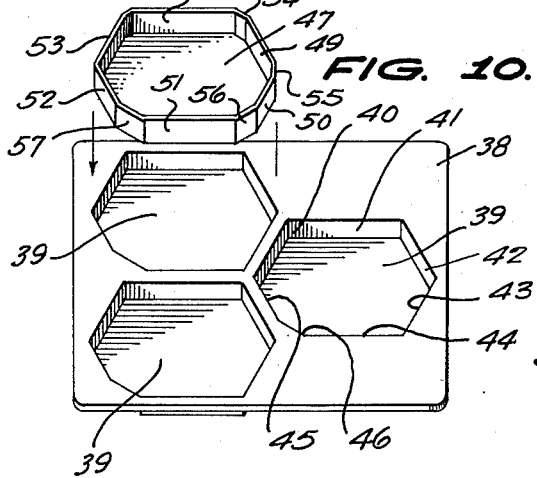
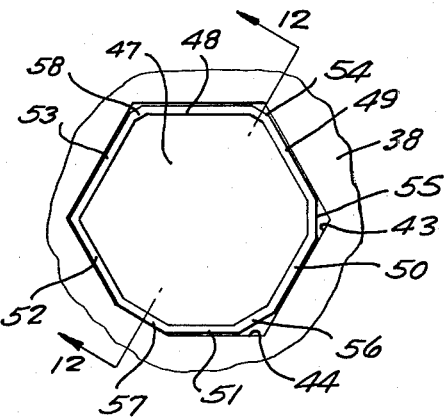
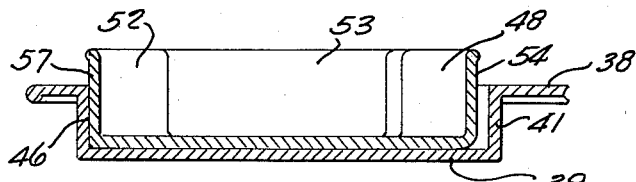
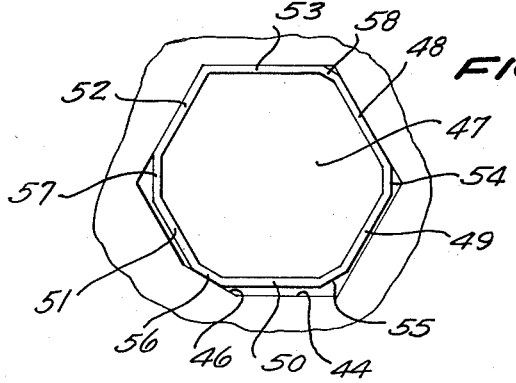

United States Patent Office 3,102,742
Patented Sept. 3, 1963

3,102,742
SELECTIVE FRICTION TELESCOPIC
CONNECTORS
John P. Shurcliff, Box 2054, Tullahoma, Tenn.
Filed July 12, 1961, Ser. No. 123,495
7 Claims. (Cl. 287—58)

The present invention is directed to adjustable connections for telescopic elements, which connections can be adjusted for varying the degree of friction between the elements.

The principal object of the present invention is to provide various types of connections suitable for various types of articles, which articles have one or more telescopic or mating elements, and which connections can be varied by relative rotation between the elements to increase or decrease the sliding, frictional contact between the elements.

A still further important object of the invention is to provide connections for two or more elements, which connections can readily be applied to various types of telescopic articles, and which connections require no tools or special skill to effect the adjustment in the frictional contact between the elements.

Further objects of the invention will be apparent in the following description of the invention as disclosed in the accompanying drawings in which:

FIG. 1 is a perspective view of a double crayon including the first form of connection according to the invention.

FIG. 2 is an enlarged, cross-sectional view taken on line 2—2 of FIG. 1.

FIG. 3 is an enlarged longitudinal sectional view taken on line 3—3 of FIG. 1.

FIG. 4 is a perspective view of three telescopic tubular elements incorporating a second form of connection according to the invention.

FIG. 5 is a greatly enlarged cross-sectional view taken on line 5—5 of FIG. 4.

FIG. 6 is an enlarged longitudinal sectional view taken on line 6—6 of FIG. 5.

FIG. 7 is an exploded view of a crayon incorporating the third form of connection according to the invention with a pencil shown for moving the crayon.

FIG. 8 is an enlarged, cross-sectional view of the crayon holder of FIG. 7.

FIG. 9 is an enlarged, cross-sectional view of a crayon only.

FIG. 10 is a perspective view of a tray and container forming the fourth type of connection according to the present invention.

FIG. 11 is a greatly enlarged view of one well and container of said tray.

FIG. 12 is a cross-sectional view taken on line 12—12 of FIG. 11, and

FIG. 13 is very similar to FIG. 11 but with the container in a second position relative to the tray.

Referring now more particularly to the accompanying drawings wherein like and corresponding parts are designated by similar reference characters, FIGS. 1–3 inclusive disclose one form of the present connection as applied by way of an example only to a double crayon holder. That is, element 1, which is the holder for the crayon, has a hexagonal cross-sectional configuration with one wall 2 thereof having a longitudinal depressed medial portion 3 forming an internal longitudinally extending convex portion. Crayons 4 are slidably inserted in the opposite ends of said tubular element 1 and each has a hexagonal cross-sectional configuration sized to slidably move within the bore of element 1. Said crayons each have a series of progressively larger spaced apart, longitudinally extending recesses, namely recesses 5, 6, 7 and 8 each in a medial portion of a side wall of said crayon and with recess 5 being smaller than recess 6, recess 6 smaller than recess 7, and recess 7 smaller than recess 8.

In use of the crayons, they are gripped by a hand encircling element 1, and the crayon applied to a writing surface which tends to position the crayon further within the holder or element 1. To increase the frictional contact between the crayon and holder, the crayon can be withdrawn from the holder, rotated around its axis the distance of one side thereof, and reinserted with, for example, recess 7 engaging convex portion 3 so that inward movement of the crayon will be further retarded due to the tighter fit between the crayon and portion 3. To obtain a still tighter fit, the crayon can be rotated after withdrawal from the holder so that either recess 6 or 5 can engage the portion 3 with each providing a progressively higher degree of friction therebetween. While element 4 is referred to as being a crayon, it may also be a lead or other marking material.

FIGS. 4, 5, and 6 disclose a further form of connection between telescopic elements, for example, as tubular members 9, 15, and 26 which may be parts of a curtain rod, or a telescopic antenna, or the like. Element 9 has an annular configuration with a series of spaced, progressively larger, longitudinally extending slots within the bore thereof, namely slot 10 which is smaller than slot 11, slot 12 which is larger than slot 11, slot 13 which is larger than slot 12 and slot 14 which is larger than slot 13.

Element 15 also has an annular, cross-sectional configuration sized for slidably moving within element 9. Said element 15 has a longitudinally extending, double protuberance 20, which is slidably positioned in recess 14 as shown in FIG. 5. However, elements 9 and 15 can be rotated around their axis relative to one another to insert protuberance 20 for either of the recesses 10, 11, 12 or 13 to vary the degrees of friction between the two elements as is found desirable.

Element 26, which also has an annular, cross-sectional configuration, is capable of sliding within element 15 and has a series of spaced, longitudinally extending, progressively larger recesses 21, 22, 23, 24, and 25 each of which can receive protuberance 20 therein by relative rotation between elements 15 and 26 when separated for varying the degree of friction between these elements. The recesses in element 26 are provided by depressing said element in those areas providing internal protuberances 27, 28, 29, 30 and 31 which can be used for receiving an additional but similar element (not shown) corresponding to element 26.

FIGS. 7–9 inclusive disclose a third form of connection between telescopic element, and as an example of this connection, there is shown a crayon holder 32 having an annular cross-sectional configuration except for a tangential portion 33. A crayon 34 is slidably mounted within holder 32 and the major portion thereof is of an annular configuration while the remainder has a series of progressively larger longitudinally extending tangential sides 35, 36, and 37. In the position indicated in the drawings, crayon 34 has side 37 contacting side 33 of the holder, and to increase the friction between crayon and holder, said crayon is withdrawn and rotated about its axis to present either side 36 or 35 to said side 33 of the holder. With side 36 being shorter and thus farther from the axis of the crayon, it will have increased friction with side 33 as compared with side 37. Side 35 is shorter than sides 36 and 37 and farther from the axis of the crayon. Therefore, side 35 will have still further greater friction with side 33 than either of the previous two sides. To extend crayon 34 or move the same from holder 32, a pencil A can have the rubber end B inserted within holder 32 for pushing the crayon therefrom. Other like objects can be used for this same purpose.

FIGS. 10-13 show a fourth form of connection which is shown by way of example only as applied to a tray 38 having a plurality of flat bottom wells 39 provided therein. Each of said wells is of a hexagonal configuration provided by straight sides 40, 41, 42, 43, 44, and 45 together with the tangential side 46. That is, side 46 extends on a tangent to sides 44 and 45 and the corner therebetween, but side 46 is of a considerably shorter length than the remaining sides.

A removable container 47 is shown for use with this tray, and it has hexagonal sides 48, 49, 50, 51, 52, and 53 with sides 48 and 49 joined by a tangential short wall 54 while adjoining sides 49 and 50 are connected by a tangential short wall 55 which is longer than wall 54. Walls 50 and 51 are connected at their common corner by a tangential wall 56 which is longer than wall 55. Walls 51 and 52 are joined by a tangential wall 57 which is longer than wall 56. Said container 47 can be placed in any of the wells 39, for example, in the manner shown in FIG. 11 where tangential wall 57 of the container mates with wall 46 of the well. To increase the friction between the container and tray, the container can be removed, rotated about its axis one-sixth of a turn, and replaced with side 56 engaging wall 46 with increased friction since wall 56 is shorter and farther from the center of the tray than wall 57. Similarly, either wall 55, 54, or 58 can be caused to engage wall 46 by rotating the container one-sixth of a turn for each wall whereby greater friction between container and tray will be obtained due to the progressively shorter walls extending a farther distance from the center of the container.

For example, the container 47 can have wall 58 engage wall 46 for the greatest friction thereby when the tray is being carried. Thereafter, the container can be rotated to present one of the other tangential walls to wall 46 whereby the container will require progressively less effort to remove the container from the tray.

It is to be appreciated that tray 28 can likewise be the top of a counter and containers for each of the wells can be provided or a greater number or less number of wells included.

The present invention is capable of considerable modification and application to a variety of articles, and such changes or their application to other articles than disclosed herein which are within the scope of the appended claims are deemed to be a part of the present invention.

I claim:

1. An adjustable connection for telescopic elements comprising at least two mating elements of which one element has an opening with the other of said elements slidably extending therein, said elements each having the same cross-section throughout the length thereof, said element opening having a uniform configuration along the major portion thereof and the remaining portion thereof being irregular relative to said major portion, and said other element having an exterior configuration of which the major portion mates with said first element major portion and the remaining portion thereof consists of a plurality of spaced-apart irregular sections each of a different size and of a configuration for mating one at a time with said first element irregular portion with a different degree of friction therebetween.

2. An adjustable connection for telescopic elements comprising at least two mating elements of which one element has an opening with the other of said elements slidably extending therein, said first element opening being of a hexagonal configuration with an indented portion and said second element being of a hexagonal peripheral configuration for mating with said first element opening and having a plurality of spaced-apart progressively larger recessed portions for mating one at a time with said first element indented portion.

3. An adjustable connection for telescopic elements comprising at least two mating elements of which one element has an annular opening with the other of said elements having an annular periphery slidably extending therein, said first element having at least one irregular portion and said second element having a plurality of spaced-apart progressively larger irregular portions for mating one at a time with said first element irregular portion.

4. An adjustable connection for telescopic elements comprising a tubular element having a hexagonal cross-sectional configuration and a protuberance in one side thereof, a second element of a hexagonal configuration slidably extending in said first element and having a series of progressively larger recesses each in a different side thereof for mating one at a time with said first element protuberance.

5. An adjustable connection for telescopic elements comprising a plurality of tubular elements of progressively larger cross-sectional configuration with each element slidably extending in the next larger element, one element having a series of spaced progressively larger longitudinal slots, the next larger element having a longitudinal portion of greater thickness for mating with one of said first element slots at a time, the element having said larger element therein having a series of spaced progressively larger longitudinal slots for mating one at a time with said larger element portion of greater thickness.

6. An adjustable connection for telescopic elements comprising a tubular member whose major portion has a round cross-sectional configuration and the remaining portion extends tangentially to said major portion, a second element slidably extending in said first element and having a major portion with a round cross-sectional configuration, and the remainder of said second element having a series of spaced progressively larger tangential sections for mating one at a time with said first element tangential portion.

7. An adjustable connection for telescopic elements comprising a member having at least one recess therein with hexagonal side walls and a short side wall extending tangentially to an adjoining pair of said hexagonal side walls and a second member having hexagonal side walls extending within said first member hexagonal side walls and a plurality of progressively larger short side wall each extending tangentially to a different adjoininig pair of said second element hexagonal side walls for mating one at a time with said first member short side wall.

References Cited in the file of this patent
UNITED STATES PATENTS

| | | |
|---|---|---|
| 2,519,625 | Becker | Aug. 22, 1950 |
| 2,610,077 | Swanson | Sept. 9, 1952 |
| 2,949,692 | Kuhn | Aug. 23, 1960 |